(12) United States Patent
Swartling et al.

(10) Patent No.: US 8,744,704 B2
(45) Date of Patent: Jun. 3, 2014

(54) METHOD FOR DETERMINATION OF GEARSHIFT POINTS

(75) Inventors: Fredrik Swartling, Södertälje (SE); Anders Kjell, Bromma (SE); Tom Nyström, Södertälje (SE)

(73) Assignee: Scania CV AB (SE)

( * ) Notice: Subject to any disclaimer, the term of this patent is extended or adjusted under 35 U.S.C. 154(b) by 95 days.

(21) Appl. No.: 13/393,428

(22) PCT Filed: Sep. 10, 2010

(86) PCT No.: PCT/SE2010/050960
§ 371 (c)(1),
(2), (4) Date: Feb. 29, 2012

(87) PCT Pub. No.: WO2011/031218
PCT Pub. Date: Mar. 17, 2011

(65) Prior Publication Data
US 2012/0166051 A1   Jun. 28, 2012

(30) Foreign Application Priority Data

Sep. 14, 2009  (SE) ........................................ 0950654

(51) Int. Cl.
*F16H 61/02*  (2006.01)
*F16H 59/18*  (2006.01)
*F16H 59/44*  (2006.01)
*B60W 10/10*  (2012.01)

(52) U.S. Cl.
USPC ............................................ 701/55; 701/58

(58) Field of Classification Search
None
See application file for complete search history.

(56) References Cited

U.S. PATENT DOCUMENTS

| 4,208,925 | A | * | 6/1980 | Miller et al. ..................... 477/63 |
| 5,479,345 | A | | 12/1995 | Amsallen |
| 5,995,896 | A | | 11/1999 | Depping et al. |
| 6,456,919 | B1 | | 9/2002 | Körner et al. |
| 6,702,713 | B2 | | 3/2004 | Edelen et al. |
| 7,463,962 | B2 | * | 12/2008 | Brunemann et al. ............ 701/55 |

(Continued)

FOREIGN PATENT DOCUMENTS

| CN | 1170700 C | 10/2004 |
| CN | 1877165 A | 12/2006 |

(Continued)

OTHER PUBLICATIONS

International Search Report dated Dec. 6, 2010, issued in corresponding international application No. PCT/SE2010/050960.

(Continued)

*Primary Examiner* — Michael J Zanelli
(74) *Attorney, Agent, or Firm* — Ostrolenk Faber LLP

(57) ABSTRACT

A method for determination of one or more downshift and upshift points for a gearbox in a motor vehicle. The vehicle includes an engine connected to the gearbox, where a downshift point represents a first engine speed at which the gearbox effects a downshift, and an upshift point represents a second engine speed at which the gearbox effects an upshift. One or more downshift and upshift points are determined relative to an engine target speed which is a desired speed for the engine. A system, a motor vehicle, a computer program and a computer program product thereof perform the method.

10 Claims, 2 Drawing Sheets

(56) References Cited

U.S. PATENT DOCUMENTS

| | | | |
|---|---|---|---|
| 7,635,318 B2 * | 12/2009 | Kitaori et al. | 477/115 |
| 2002/0160880 A1 | 10/2002 | Sekii et al. | 477/143 |
| 2006/0224291 A1 * | 10/2006 | Geist et al. | 701/51 |
| 2009/0265067 A1 * | 10/2009 | Wolfgang et al. | 701/58 |
| 2009/0271081 A1 * | 10/2009 | Watanabe et al. | 701/60 |

FOREIGN PATENT DOCUMENTS

| | | |
|---|---|---|
| EP | 0352551 A2 | 1/1990 |
| EP | 0 742 384 A2 | 11/1996 |
| EP | 1013497 A2 | 6/2000 |
| JP | 2004-316845 * | 11/2004 |
| WO | WO 2007/118783 A1 | 4/2007 |
| WO | WO2008/044609 A1 * | 4/2008 |

OTHER PUBLICATIONS

English Translation of Office Action dated Jun. 6, 2013 issued in corresponding Russian Patent Application No. 2012114884.

Supplementary Search Report dated May 8, 2013 issued in corresponding European Patent Application No. 10815701.7.

Chinese Office Action dated Dec. 23, 2013 issued in corresponding Chinese Application No. 2010800405667 with English translation.

* cited by examiner

METHOD FOR DETERMINATION OF GEARSHIFT POINTS

CROSS-REFERENCE TO RELATED APPLICATIONS

The present application is a 35 U.S.C. §§371 national phase conversion of PCT/SE2010/050960, filed Sep. 10, 2010, which claims priority of Swedish Application No. 0950654-4, filed Sep. 14, 2009, the contents of which are incorporated by reference herein. The PCT International Application was published in the English language.

TECHNICAL FIELD

The present invention relates to a method for determination of one or more downshift and upshift points for a gearbox in a motor vehicle. The invention further relates to a system, a motor vehicle, a computer programme and a computer programme product thereof for performing the method.

BACKGROUND TO THE INVENTION

FIG. 1 depicts schematically parts of a power train for a motor vehicle 1, such as a passenger car or a heavy vehicle, e.g. a truck or bus. The power train comprises an engine 10 mechanically connected by a shaft to a first end of a gearbox 20 via a clutch device 40. The gearbox 20 is also mechanically connected, at its other end, by a propeller shaft 50 to a differential gear 30 associated with a rear axle. The rear axle comprises respective left and right drive shafts 60 which drive the vehicle's powered wheels (not depicted in the diagram).

With this well-known arrangement, the mechanical work of the engine 10 is transmitted via various transmission devices (e.g. clutch device 40, gearbox 20, propeller shaft 50, differential gear 30 and drive shafts 60) to powered wheels in order to move the vehicle 1. An important device in the power train is the gearbox 20, which has a number of forward gears for moving the vehicle 1 forwards, and usually also a reverse gear. The number of forward gears varies but modern kinds of trucks are usually provided with twelve forward gears.

The gearbox 20 may be of manual or automatic type (automatic gearbox), but also of the automatic manual gearbox type (automatic manual transmission, AMT). Automatic gearboxes and automatic manual gearboxes are automated gearbox systems usually controlled by a control unit 110 (sometimes also called electronic control unit, ECU) which is adapted to controlling the gearbox 20, e.g. during gear changing, as when choosing gears at a certain vehicle speed with a certain running resistance. The ECU may measure engine speed and the state of the gearbox 20 and control the gearbox by means of solenoid valves connected to compressed air devices. Information about the engine 10, e.g. its speed and torque, is also sent from the engine 10 to the ECU, e.g. via a CAN (controller area network) bus.

The specification of U.S. Pat. No. 5,479,345 discloses a method and a device for choice of shift points. The factors of road gradient, the vehicle's speed and its gross weight relative to the power, in hp, needed to maintain its current speed, and the engine speed and available power expected upon completion of a gear change are taken into account in determining whether a gear change is or is not allowed.

In conventional gear change systems, the control unit 110 uses tabulated engine speed limits, also called shift points, which represent the engine speed at which a downshift or upshift should be effected in the gearbox 20, i.e. the vehicle 1 changes gear when the speed of its engine 10 passes a speed represented by a shift point. The shift points may therefore be construed as providing information not only about when a downshift or upshift should take place but also about the number of gear steps to be effected at each downshift or upshift. It is usual for each shift point to comprise one to three gear steps, but more steps are possible.

FIG. 2 depicts schematically an example of various tabulated shift points represented by lines SP1-SP6 in a graph where the x axis represents engine torque and the y axis the speed of the engine 10 in revolutions per minute (rpm). So long as the engine speed is between shift lines SP1 and SP4 no gear change takes place, but if it rises above an upshift line, SP1-SP3, an upshift is initiated, and similarly a downshift is initiated if the engine speed drops below a downshift line, SP4-SP6. Table 1 below shows a number of upward or downward gear steps for each of the lines SP1-SP6. For example, an upshift by one step takes place if the engine speed rises above line SP1 and a downshift by two steps if the engine speed drops below line SP5.

TABLE 1

| Downshift and upshift lines SP1-SP6 ||
| --- | --- |
| SP1 | Engine speed for upshift by 1 step |
| SP2 | Engine speed for upshift by 2 steps |
| SP3 | Engine speed for upshift by 3 steps |
| SP4 | Engine speed for downshift by 1 step |
| SP5 | Engine speed for downshift by 2 steps |
| SP6 | Engine speed for downshift by 3 steps |

Shift point choices affect inter alia running characteristics, acceleration, comfort and fuel consumption for the vehicle 1, so shift points have to be accurately calibrated by vehicle manufacturers. This calibration involves various gearshift strategies being tested in the field in different driving situations, e.g. with different amounts of acceleration applied, different road gradients and different vehicle-combination weights. The test results have then to be thoroughly analysed to determine appropriate shift points. This procedure for calibration of shift points is both time-consuming and expensive. Moreover, the results of the calibration are not always satisfactory in that the calibrated shift points may be appropriate for certain driving situations but less so for others.

BRIEF DESCRIPTION OF THE INVENTION

An object of the present invention is to propose an alternative method for determining one or more downshift and upshift points. Another object of the invention is to propose a method which totally or partly solves the problems of the state of the art. A further object of the invention is to propose a method which allows flexible and simple determination of one or more downshift and upshift points.

According to an aspect of the invention, the above objects are achieved with a method for determination of one or more downshift and upshift points for a gearbox in a motor vehicle. The vehicle comprises an engine connected to, the gearbox in order to drive the gearbox. A downshift point represents a first engine speed at which the gearbox to effects a downshift, and an upshift point represents a second engine speed at which the gearbox effects an upshift. The method comprises determining the one or more downshift and upshift points relative to an engine target speed $\omega_T$ which is a desired speed for the engine.

The invention further relates to a computer program comprising program code, and, when the program code is executed in a computer, it causes the computer to effect the method disclosed herein. The invention further relates to a computer program product belonging to the computer program.

According to another aspect of the invention, the above objects are achieved with a system for determination of one or more downshift and upshift points, comprising at least one control unit configured to control a gearbox in a motor vehicle which comprises an engine connected to the gearbox, in order to drive the gearbox. A downshift point represents a first engine speed at which the gearbox effects a downshift, and an upshift point represents a second engine speed at which the gearbox effects an upshift. The system is further configured to determine the one or more downshift and upshift points relative to an engine target speed $\omega_T$ which is a desired speed for said engine.

The invention further relates to a motor vehicle which comprises at least one system as above.

A method and a system according to the invention provide a flexible and simplified solution for determination of one or more downshift and upshift points. The fact that the shift points are related to a desired engine target speed makes it substantially easier to alter them. This makes it very easy to adjust gear change configurations to changing needs by raising or lowering the engine target speed. Another advantage is that shift point changes do not entail having to recalibrate every shift point. Calibration work is generally reduced substantially by a method and a system according to the invention.

A further advantage of the invention is that the shift points can be altered without the gear change logic, e.g. in a control unit, having to risk becoming logically unstable, since the shift points are controlled indirectly via the engine target speed, so the relationship between the shift points can be controlled in such a way as to avoid instability.

Further advantages and applications of a method and a system according to the invention are indicated by the detailed description set out below.

BRIEF DESCRIPTION OF THE DRAWINGS

In the detailed description of the present invention set out below, embodiments of the invention are described with reference to the attached drawings, in which.

DETAILED DESCRIPTION OF THE INVENTION

The present invention relates to determination of one or more downshift and upshift points for a gearbox 20 preferably situated in a motor vehicle 1. A downshift or upshift point represents an engine speed at which the gearbox 20 is respectively adapted to effecting a downshift or upshift. The engine speed for upshift points is higher than the engine speed for downshift points.

The gearbox 20 is preferably of the kind which forms part of an automated gear change system controlled by a control unit 110, e.g. an ECU. In such a system, gear changes are effected automatically by the control unit 110 but it is also usual for the driver to be able to execute manual gear changes in such a system, what is known as manual gear change in automatic state (automatic mode). The gearbox 20 also has a plurality of gears, e.g. twelve forward gears and one or more reverse gears are usual in modern trucks.

Figure 3:
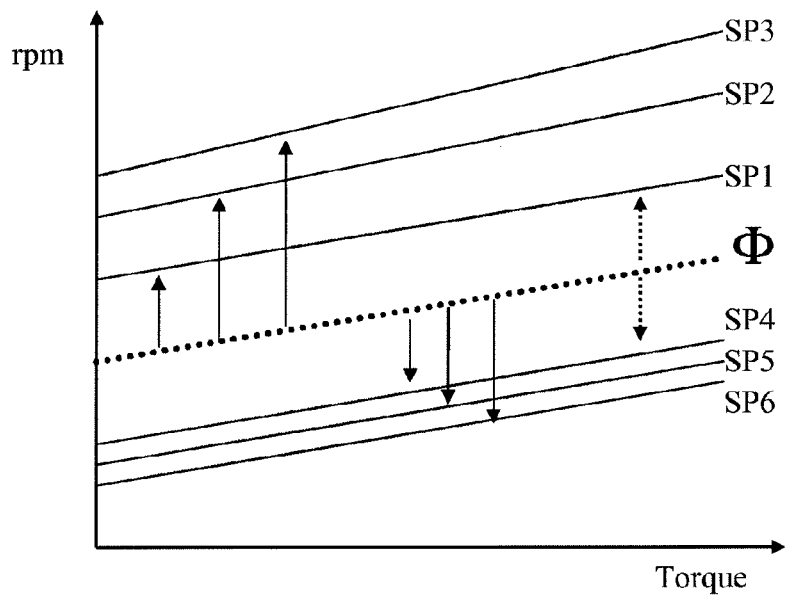
FIG. 3 is a graph of downshift and upshift lines related to an engine target speed line.

According to the invention, the downshift and upshift points are determined relative to an engine target speed $\omega_T$ which is a desired speed for the engine 10 of the vehicle 1. This means that the downshift and upshift points are always determined on the basis of the engine target speed $\omega_T$. In FIG. 3 an engine target speed line $\Phi$ in the form of a dotted line appears between upshift lines SP1-SP3 and downshift lines SP4-SP6. The diagram contains arrows showing how upshift lines SP1-SP3 and downshift lines SP4-SP6 are related to the engine target speed line $\Phi$. They indicate that if the engine target speed line $\Phi$ is altered (by being moved upwards or downwards in parallel according to the dotted arrows) the engine speed for the shift lines SP1-SP6 will also move in parallel. The shift lines SP1-SP6 may for example accompany the target speed line $\Phi$ proportionally to a scale factor which may be different for upshift and downshift lines respectively but may also be the same, in which case an established mutual relationship between the upshift and downshift points is achieved. It is also possible to have an individual scale factor for each shift line SP1-SP6, i.e. certain shift lines SP1-SP6 may change more or less than other shift lines SP1-SP6 on the basis of the same change in the target speed line $\Phi$.

The invention thus proposes a method which makes it easier to determine the downshift and upshift points in that they are always related to an engine target speed $\omega_T$, which means that a change in the value of the target speed $\omega_T$ also affects the engine speed values of the shift points, so the procedure of calibration according to the state of the art described above can be avoided. The invention thus makes it possible to save time and reduce costs.

The engine target speed $\omega_T$ may be determined on the basis of assumptions and knowledge about the mode of operation and performance of the engine 10. An engine 10 usually runs more efficiently and better at certain speeds than at others. More efficient and better may mean less fuel consumption, lower vibration levels and quieter running. According to an embodiment, the target speed $\omega_T$ will be within the range 500-2500 rpm for all downshift and upshift points for the engine 10, and according to another embodiment preferably within the range 1000-1400 rpm.

Another advantage of the method according to the invention is that adaptation of gearboxes to different engines 10, and vice versa, is substantially facilitated. Once an engine target speed $\omega_T$ has been established for a specific engine model or a specific automatic gear system, the control unit 110 can then determine the shift points related to the target speed $\omega_T$. This makes it possible to reduce the lead times for putting new engines 10 and/or automated gear change systems on the market.

According to another embodiment of the invention, other parameters may also be taken into account when determining the engine target speed $\omega_T$, e.g. accelerator pedal position, driving mode, cruise control setting, running resistance (i.e. the force acting against the vehicle 1 in its direction of movement), road gradient, engine power and map data.

The parameters of accelerator pedal position, driving mode (in terms of various predetermined running states selectable in an automatic gear change system, e.g. economy state or power state) and cruise control setting involve the driver being able to affect directly the engine target speed $\omega_T$ and hence indirectly the downshift and upshift points, since they are related to the target speed $\omega_T$. For example, this embodiment may be so implemented that the target speed $\omega_T$ is determined by driving mode and acceleration pedal position.

The position of the accelerator pedal may affect the target speed $\omega_T$ by application of a table which converts the pedal position to the change in engine target speed so that more acceleration results in a higher target speed $\omega_T$.

The other parameters, viz. running resistance, road gradient, engine power and map data, may also be used for determining the engine target speed $\omega_T$ and may be provided by means of sensors and intelligent signal and control systems which are present in today's motor vehicles 1. It should be noted that not all of the aforesaid parameters need be taken into account, since one or more in combination may produce good results, or they may alternatively be used by a control unit 110, e.g. an ECU.

The engine target speed $\omega_T$ may also be a preset parameter which can be adjusted by a service technician at an engine workshop. With such a version of the invention, the target speed $\omega_T$ is a parameter which is kept static between adjustments. Adjustment of the target speed $\omega_T$ may entail its trimming for better performance and/or for individual setting of running characteristics to suit the customer's preferences.

According to another embodiment of the invention, the engine target speed $\omega_T$ is a dynamic parameter. For example, a dynamic parameter may be altered by the driver by means of a control unit (manual control), e.g. a cruise control, accelerator pedal etc. A dynamic parameter may also be altered by a system of sensors and signalling and control systems (automatic control) described above. It is also possible to combine manual and automatic control, with or without map data to provide, for example, topographical information about roads, which can be used in conjunction with GPS technology. It is also possible to control the engine target speed $\omega_T$ dynamically by means of wireless communication (e.g. satellite communication systems or mobile communication systems such as GSM, GPRS, EDGE or LTE) by a communications centre sending control signals via a wireless communication system to the vehicle 1 to control the target speed $\omega_T$. With an embodiment as above, in which the target speed $\omega_T$ is a dynamic parameter, the running characteristics may be controlled continuously according to prevailing circumstances.

According to a further embodiment of the invention, downshift and upshift points are calculated in real time, and in addition to being related to an engine target speed $\omega_T$ they may also depend on one or more of the parameters belonging to the category which comprises the following: change in engine speed during gear changing, defined as a difference in engine speed between a point in time when a gear change is initiated and a time when it is completed; change in running speed of the vehicle 1 during gear changing; and the torque curve for said engine 10. It is for example possible to use the change in engine speed during gear changing to calculate what engine speed before the gear change results in a specific engine target speed after the gear change, and vice versa. The torque of the engine 10 may be used to calculate the acceleration of the vehicle 1 during and after the gear change, which itself affects how much the engine speed needs to be changed. The advantage of this embodiment is for example that the target speed $\omega_T$ can immediately be adjusted to prevailing running conditions for the vehicle 1.

Specialists will appreciate that a method for determination of one or more downshift and upshift points according to the present invention might also be implemented in a computer program which, when executed in a computer, causes the computer to effect the method. The computer program is contained in a computer program product's computer-readable medium which takes the form of a suitable memory, e.g. ROM (read-only memory), PROM (programmable read-only memory), EPROM (erasable PROM), flash memory, EEPROM (electrically erasable PROM), hard disc unit, etc.

The invention also relates to a system for determination of one or more downshift and upshift points. The system comprises at least one control unit (e.g. an ECU for a gearbox 20) adapted to controlling a gearbox 20 in a motor vehicle 1. The gearbox 20 is connected to an engine 10 which drives the gearbox 20 and other parts of the power train. The system is adapted, according to the concept of the invention, to determining one or more downshift and upshift points relative to an engine target speed $\omega_T$ which is a desired engine speed for the engine 10.

Figure 4:
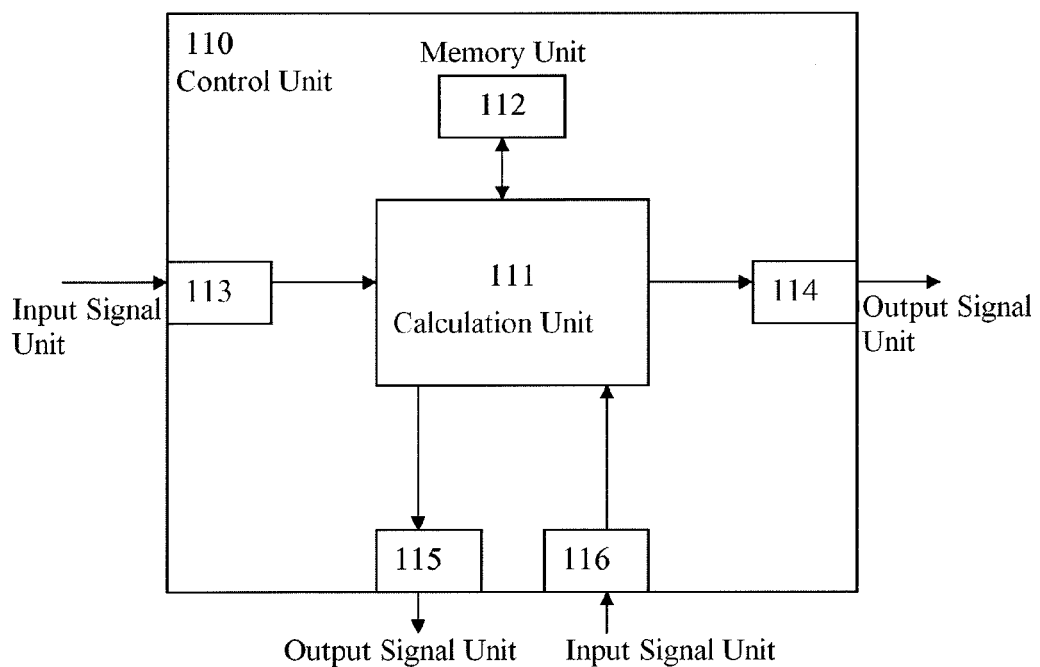
FIG. 4 depicts a control unit forming part of a system according to the invention.

FIG. 4 depicts schematically a control unit 110. The control unit 110 comprises a calculation unit 111 which may take the form of substantially any suitable type of processor or microcomputer, e.g. a circuit for digital signal processing (digital signal processor, DSP) or a circuit with a predetermined specific function (application specific integrated circuit, ASIC). The calculation unit 111 is connected to a memory unit 112 which is incorporated in the control unit 110 and which provides the calculation unit 111 with, for example, the stored program code and/or the stored data which the calculation unit 111 needs for it to be able to perform calculations. The calculation unit 111 is also adapted to storing partial or final results of calculations in the memory unit 112.

The control unit 110 is further provided with devices 113, 114, 115, 116 for respectively receiving input signals and sending output signals. These input and output signals may comprise waveforms, pulses or other attributes which the signal receiving devices 113, 116 can detect as information and which can be converted to signals which are processable by the calculation unit 111. The calculation unit 111 is then provided with these signals. The signal sending devices 114, 115 are adapted to converting signals received from the calculation unit 111 in order to create, e.g. by modulating the signals, output signals which can be transmitted to other parts of the system for determination of downshift and upshift points. One skilled in the art will appreciate that the aforesaid computer may take the form of the calculation unit 111 and that the aforesaid memory may take the form of the memory unit 112.

Figure 1:
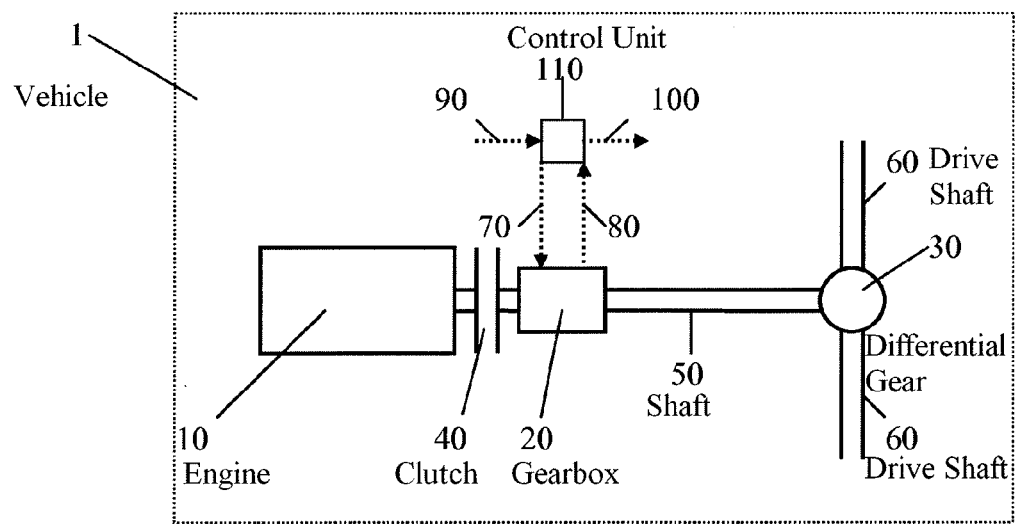
FIG. 1 depicts schematically part of a power train for a motor vehicle with rear wheel drive.
Figure 2:
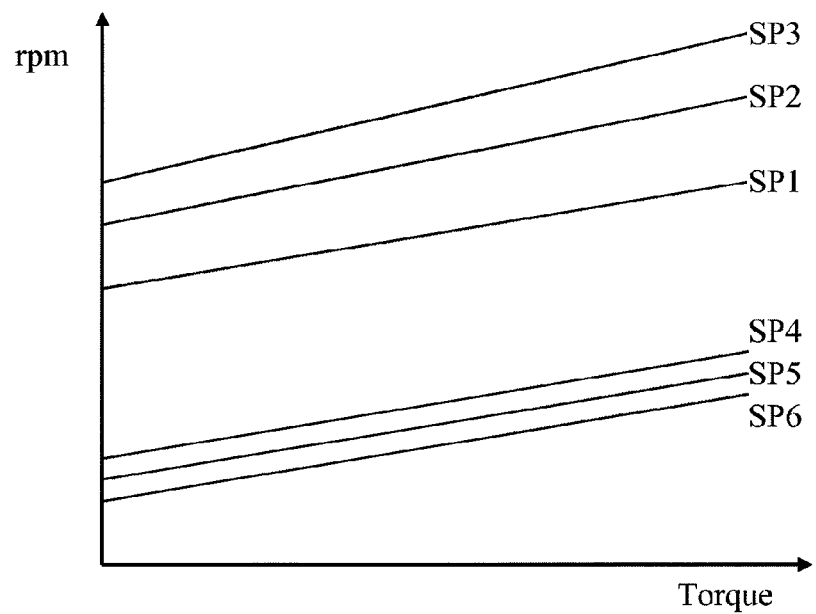
FIG. 2 is a graph of downshift and upshift lines.

Each of the connections to the devices for respectively receiving input signals or sending output signals may take the form of one or more from among the following: cable, data bus, e.g. CAN (controller area network) bus, MOST (media orientated systems transport) bus or some other bus configuration, or a wireless connection. The connections 70, 80, 90, 100 in FIG. 1 may also take the form of one or more of these cables, buses or wireless connections.

Specialists will also appreciate that the above system may be modified according to the various embodiments of the method for determination of one or more downshift and upshift points according to the invention. The invention relates also to a motor vehicle 1, e.g. a truck or bus, comprising at least one system for determination of one or more downshift and upshift points according to the invention.

Finally, the present invention is not limited to its embodiments described above, but relates to and comprises all embodiments within the scope of protection of the attached independent claims.

The invention claimed is:

1. A method for determining one or more downshift and upshift points for a gearbox in a motor vehicle wherein the vehicle comprises an engine connected to the gearbox to drive the gearbox, wherein a downshift point represents a first engine speed at which the gearbox is configured to effect a downshift, and an upshift point represents a second engine speed at which the gearbox is configured to effect an upshift, the method comprising determining one or more downshift and upshift points relative to an engine target speed which is a desired speed for the engine, wherein the engine target speed is a dynamic parameter which may be altered during use of the motor vehicle.

2. A method according to claim 1, wherein the determining one or more downshift and upshift points comprises also determining the engine target speed.

3. A method according to claim 1, wherein the engine target speed is a function of one or more of the dynamic parameters selected from the group consisting of accelerator pedal position, driving mode, running resistance, road gradient, cruise control setting, engine power and map data.

4. A method according to claim 1, wherein the engine target speed is a preset static parameter.

5. A method according to claim 1, wherein the engine target speed is the same for all of the one or more downshift and upshift points and is within the engine speed range of 500-2500 rpm.

6. A method according to claim 1, wherein the gearbox is controlled by a control unit and is an automatic gearbox or an automated manual gearbox comprising a plurality of gears, and the motor vehicle is a truck or a bus.

7. A method according to claim 1, wherein the determining of one or more downshift and upshift points further comprises, calculating one or more downshift and upshift points in real time, and further comprises determining one or more of the parameters selected from the group consisting of change of engine speed during gear changing, change of running speed of the motor vehicle during gear changing, and torque curve for the engine.

8. A method according to claim 1, wherein the first and second engine speeds are respectively lower and higher than the engine target speed.

9. A method according to claim 8, wherein the upshift and downshift comprise respectively one or more downshift steps and one or more upshift steps.

10. A computer program product comprising a non-transitory computer-readable medium and a computer program on the non-transitory computer readable medium, which program comprising program code which, when the program code is executed in a computer, causes the computer to effect the method according to claim 1;

wherein the computer program is contained in the computer-readable medium which is within the category which is selected from the group consisting of ROM (read-only memory), PROM (programmable ROM), EPROM (erasable PROM), flash memory, EEPROM (electrically erasable PROM) and hard disc unit.

* * * * *